(12) United States Patent
Schembri et al.

(10) Patent No.: US 7,951,474 B2
(45) Date of Patent: May 31, 2011

(54) GAS RELEASE VALVE (75) Inventors: George Schembri, Birkirkara (MT); Joseph Pule', Vittoriosa (MT); Joseph Cilia, Zebbug (MT); Werner Schmidt, Schondorf (DE)

(73) Assignee: Abertax Reserach & Development Ltd, Paola (MT)

( * ) Notice: Subject to any disclaimer, the term of this patent is extended or adjusted under 35 U.S.C. 154(b) by 872 days.

(21) Appl. No.: 11/908,125

(22) PCT Filed: Mar. 10, 2006

(86) PCT No.: PCT/EP2006/060633
§ 371 (c)(1),
(2), (4) Date: Oct. 26, 2007

(87) PCT Pub. No.: WO2006/095023
PCT Pub. Date: Sep. 14, 2006

(65) Prior Publication Data
US 2008/0166625 A1 Jul. 10, 2008

(30) Foreign Application Priority Data

Mar. 10, 2005 (DE) .............. 20 2005 003 835 U (51) Int. Cl.
*H01M 2/12* (2006.01)
*F16K 15/14* (2006.01)

(52) U.S. Cl. ............... 429/54; 429/55; 429/61; 429/89; 137/852; 137/860

(58) Field of Classification Search ............. 429/53, 429/54, 55, 61, 88, 89; 137/852, 860
See application file for complete search history.

(56) References Cited

U.S. PATENT DOCUMENTS 3,825,444 A * 7/1974 Martin .................. 429/88 X
4,296,186 A * 10/1981 Wolf ....................... 429/54
6,376,119 B1 4/2002 Nann et al.
6,376,120 B1 * 4/2002 Azema .................... 429/61

FOREIGN PATENT DOCUMENTS
EP 1098377 5/2001
GB 2086646 5/1982
WO 99/66582 A 12/1999

* cited by examiner

Primary Examiner — Stephen J. Kalafut
(74) Attorney, Agent, or Firm — Themis Law (57) ABSTRACT

A gas release valve to be mounted in an access port of a battery cell includes a housing, the upper side of which is closed by a lid. The lower side of the lid has an opening leading into the battery cell and is in communication, via degassing passageways closed by an elastic sealing element, with at least one vent provided in the lid. The elastic sealing element is a preloaded non-return element, the inner surface of which is urged into sealing contact with a seat provided in the housing by it s own elasticity and, in addition, by a pressure differential with the outer pressure that acts through the vent against the outer surface of the sealing element.

19 Claims, 5 Drawing Sheets

GAS RELEASE VALVE

FIELD OF THE INVENTION

The present invention relates to a gas release valve to be mounted in an access port of a battery cell. This type of gas release valves has particular application in battery cells, where it is desired to avoid leakage of accumulator acid or gel and hydrogen gas under normal pressure conditions and, at the same time, ensure degassing of the battery cell at predetermined inner pressure conditions.

BACKGROUND OF THE INVENTION

Gas release from batteries is controlled with different types of devices in the prior art. Such devices include vent plugs that are used for batteries of vehicles and of stationary drive units. These plugs are provided with a centric opening which, however, cannot avoid an uncontrollable leakage of liquid from the storage battery giving rise to localized corrosion on the outer parts of the accumulator.

WO 99/36976 discloses a device for valve-regulated electric storage batteries that includes a housing to be inserted in an access port of the battery cell. Said housing comprises a lid provided with vents the lower openings, which are closed by a flame arrester fixed in the upper part of an axial opening leading into the battery cell. The lower part of said opening is closed by a valve member formed of a valve body, which includes a pair of opposed vents extending along the lower part of the valve body and defining gas-flow passages from an upstream to a downstream side of the valve body. A series of spaced-apart annular ridges formed on the outer surface of the valve body permit the valve member to be inserted into, and seal by means of a press fit, the inner walls of the housing. The valve member also includes a resilient, radially-outwardly extending annular skirt flaring outwardly in the downstream direction and having an annular free end normally engaging the side wall of the axial opening.

This degassing valve has a rather complicated construction and the sealing element in the form of a resilient skirt may lose, after a certain time, its elastic sealing properties against the cylindrical seat provided in the housing. This will cause hydrogen gas, generated in the cell, to be continuously vented at any internal pressure and to reverse atmospheric pressure from outside to enter the battery at any time.

SUMMARY OF THE INVENTION

It is an object of the invention to provide a gas release valve for battery cells that has a simple construction and that requires only few component parts but that nonetheless ensures a safe and reliable operation, such that outside air will never be able to enter the cell.

It is another object of the present invention to provide a gas release valve that will enable a degassing of the battery cell at predetermined internal pressure levels and with small pressure tolerances, according to standards prescribed by the producer.

These and other objects of the invention are achieved by providing a gas release valve to be mounted in an access port of a battery cell, which includes a housing having an upper side that is closed by a lid, whereas the lower side has an opening leading into the battery cell. Said opening is in communication, via degassing passageways closed by means of an elastic sealing element, with vents provided in the lid, wherein said elastic sealing element is a preloaded non-return element the inner surface of which is urged into sealing contact with a seat provided in said housing by its own elasticity. An increasing outer pressure acting through said vents against the outer surface of said sealing element also maintains contact with the seat in the housing.

In a preferred embodiment, the preloaded elastic sealing element is an annular collar or O-ring, the seat of which is formed at the outer end of radial degassing conduits communicating with an axial degassing channel provided in the housing.

In this embodiment, the elastic sealing element may be an O-ring easily available in commerce. The preloading characteristics of such a sealing element may be predetermined by choosing the material (rubber, synthetics or the like) and its degree of hardness. With this construction, the overpressure may be exactly predetermined, that is, the internal pressure at which the degassing phase should begin. The response level or threshold for the beginning of the degassing phase may also be predetermined by the diameter of the sealing element or by the geometry of its seat. Tests have shown that with this construction the responsiveness of the pressure level may be adjusted for a difference between opening pressure and closing pressure of only 10 mbar.

Conveniently, the diameter of the radial degassing conduits may be very small, e.g. 1 mm.

A further advantage of the invention is that the elastic sealing element is secured in the interior of the housing such that it is protected against aggressive liquid inside the battery cell.

According to an advantageous modification, the radial degassing conduits may be formed between the lower surface of the lid secured in the housing and an opposite upper surface of the inner wall of the housing. Such an embodiment provides a very simple construction of the valve because it is split between the housing and the lid such that the radial degassing conduits are formed exactly in the separating zone between housing and lid.

In this embodiment, the axial degassing channel may be formed between a central stem axially projecting from the lower surface of the lid and the cylindrical opening of the housing leading into the battery cell. The cylindrical outer surface of the stem may be provided with axial grooves.

According to a further modification of the invention, the preloaded elastic sealing element may be a circular disc having a thick central part and a flexible annular outer edge resting on its seat which is in the form of an annular support provided by the inner wall of the housing.

In this embodiment, the circular disc is held in its position by a nose axially protruding from the lower surface of the lid and being in abutment contact with the central part of the circular disc.

According to a further embodiment of the invention, the elastic sealing element may be a flexible tubular skirt firmly fastened in the housing, an upwardly extending inner surface of said tubular skirt being in tight sealing abutment against its seat on the outer surface of a cylindrical element projecting from the lower surface of the lid.

In this construction, the lid may form an integral part of the housing which has the advantage that the gas release valve is made up of only two parts, that is, the housing comprising the lid and the tubular sealing skirt.

BRIEF DESCRIPTION OF THE FIGURES

Further object, features and advantages of the invention will be readily apparent upon reading of the following description of preferred embodiments illustrated in the drawings, in which.

DETAILED DESCRIPTION OF EMBODIMENT OF THE INVENTION

Figure 1:
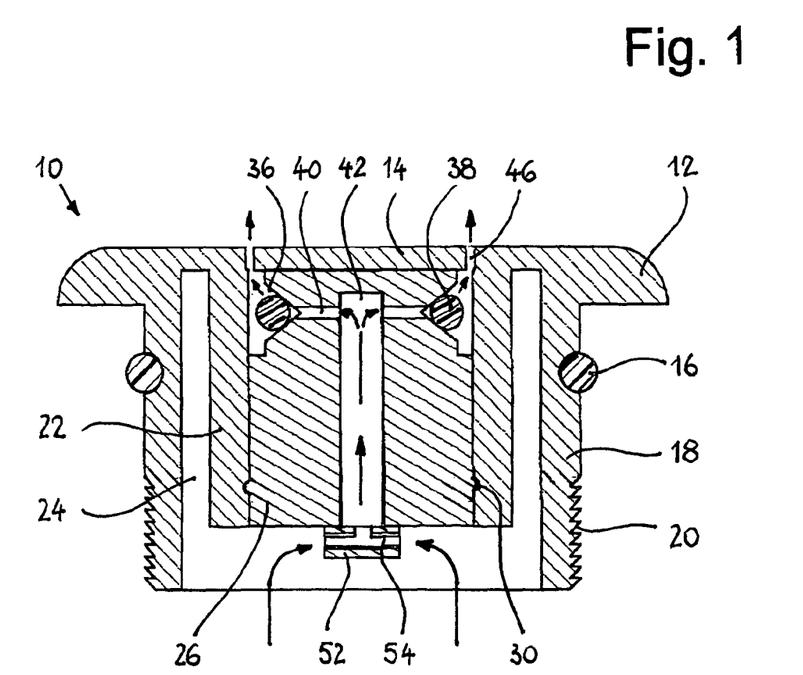
FIG. 1 is a cross-sectional view of a first embodiment of the invention.
Figure 2:
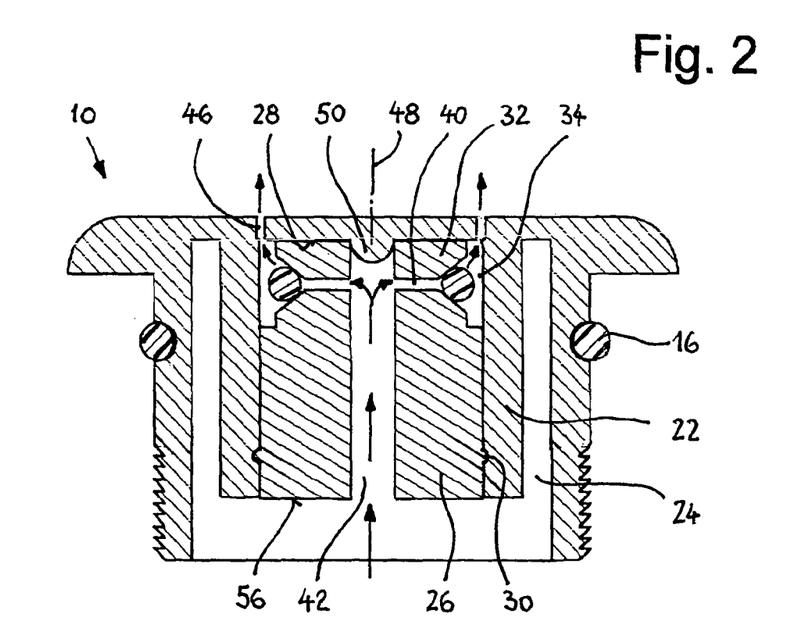
FIG. 2 is a modified form of the valve illustrated in FIG. 1 providing a second embodiment of the invention.

In FIGS. 1 and 2, a cylindrical adapter plug 10 is illustrated that is manufactured as an injection molded element. Said plug 10 may be inserted into an access port of a battery cell for vehicles or other machines, and the protruding rim 12 of its lid 14 abuts against the upper edge of said access port. An O-ring 16 is inserted into an annular groove of the cylindrical outer wall 18 of the plug 10 and provides for a tight sealing against the access port of the battery cell.

The outer wall 18 of the plug 10 is provided with means for fastening the plug 10 in the access port. These means may be, as illustrated, a screw thread 20; other fixing means may be bayonet-fasteners, snap-fasteners or the like.

From the lower surface of the lid 14 a hollow cylindrical body 22 is protruding that has a radial distance to the inner surface of the outer wall 18 of the plug 10, such that an annular chamber 24 is defined. Into said hollow body 22 a cylindrical valve housing 26 is inserted, which may also be made as an injection molded part. The valve housing 26 is press-fitted in the hollow body 22, where it is secured by a snap-fastener bead 30. The upper surface of the valve housing 26 abuts against the lower surface 28 of the lid 14.

Figure 3:
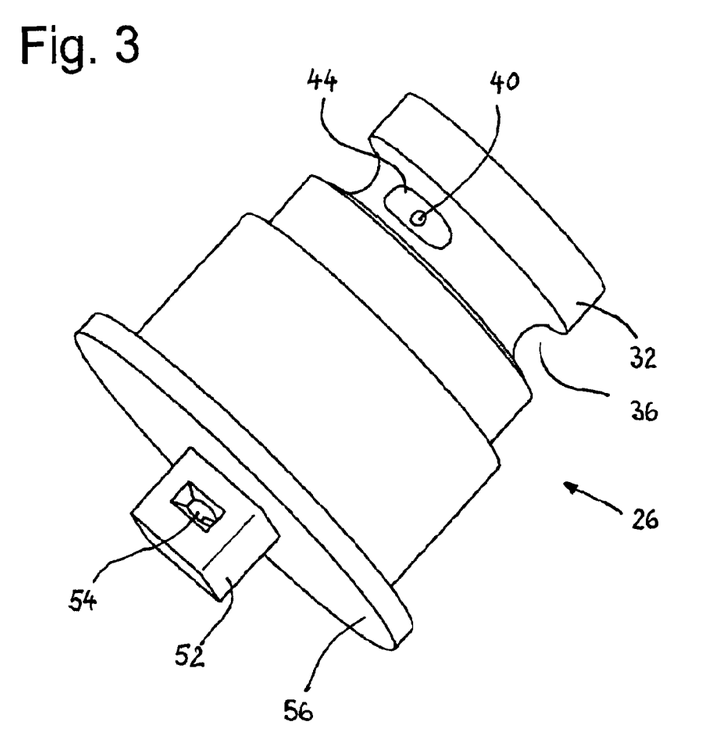
FIG. 3 is a perspective view of the housing of the valve according to FIG. 1.

As illustrated in FIGS. 1 and 2, the upper part 32 of the valve body 26 has a smaller diameter than its lower part such that an annular cavity 34 is defined. Said upper part 32 of the valve body 26 is provided with an annular groove 36, which is the seat for an annular sealing element 38, for example an O-ring, made of an elastic material that is in preloaded contact with its seat 36. A plurality of small radial degassing conduits 40 lead into the annular groove 36 and are connected to an axial degassing channel 42 of the valve housing 26. Said axial channel 42 is the opening of the valve housing 26 leading into the battery cell. As illustrated in FIG. 3, the outlet orifices of the radial degassing conduits 40 are in the form of oval recesses 44 built in the annular groove 36.

As already mentioned, the diameter of the radial degassing conduits 40 is much smaller than the diameter of the axial degassing channel 42 and may be of only 1 mm.

The lid 14 includes a plurality of vents 46 which may be arc-shaped slits and which communicate with the annular cavity 34. The arc-shaped slits or vents 46 have a concentric geometry with respect to the axis 48 of the lid 14 and of the plug 10 as a whole.

In the embodiment illustrated in FIG. 1, the axial degassing channel 42 is closed at its upper end, whereas in the embodiment of FIG. 2 said axial degassing channel 42 runs through the valve housing 26, and its upper end is closed by a nose 50 axially protruding from the lower surface 28 of the lid 14. Accordingly, also in this embodiment the axial channel 42 is leak-proof at its upper end.

As illustrated in FIG. 1, the lower end of the axial degassing channel 42 may be closed by a baffle element 52 provided with radial channels 54 leading into the battery cell and communicating with the axial channel 42. This baffle element 52 may also be made up of a molded part fixed to the lower surface 56 of the valve housing 26, for example, by adhesive bonding. The baffle element 52 has the purpose to avoid penetration of impurities and other particles into the axial degassing channel 42 and consequently into the small radial degassing conduits 40, where they may cause obstructions.

Figure 4:
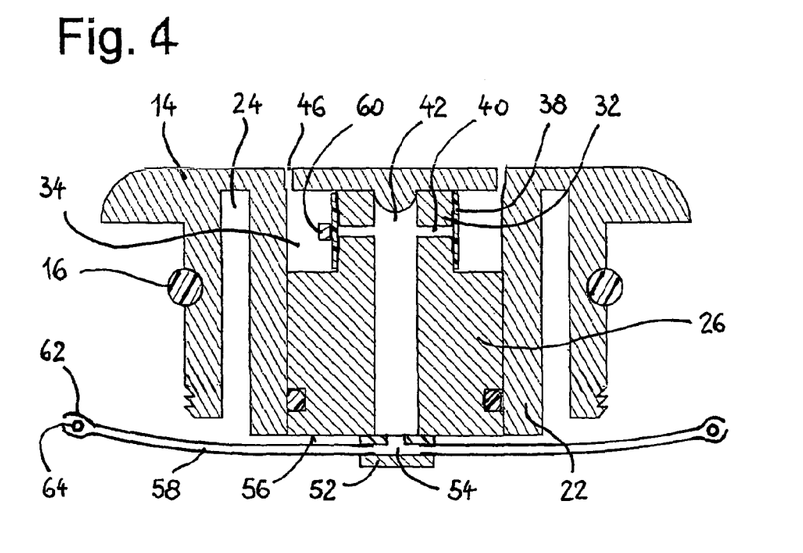
FIG. 4 is a cross-sectional view of a third embodiment of the invention.

FIG. 4 illustrates that horizontal gas inlet channels 54 of the baffle element 52 may be provided with tubular extension conduits 58 leading into the battery cell. Preferably, said extension tubes 58 are slightly inclined upwards. With this construction, a secure degassing of the battery cell is guaranteed also in the case of an inclined position of the battery cell.

The open ends of the tubular conduits 58 may be provided with self-acting shutters 64, for example balls, each of which is freely movable in an enlarged seat 62 at the open end of the conduit 58. If the battery has an inclined position, for example within an aircraft, the downwardly extending shutter 64 avoids entrance of liquid into the lower conduit 58 and consequently obstruction of the baffle element 52, whereas the free end of the opposite tubular conduit 58 is open such that gas may enter into it.

In the embodiment of FIG. 4, the sealing element 38 is an annular collar which is in preloaded contact with its seat at the upper part 32 of the valve housing 26. In this case, the valve housing 26 and its upper part 32 may have a prismatic section.

The arrows in FIGS. 1 and 2 illustrate the gas flow during the degassing phase of the battery cell. Under predetermined pressure differential conditions, the gas will enter the axial degassing channel 42 directly (FIG. 2) or through the inlet channels 54 of the baffle element 52 (FIG. 1). At the upper end of the axial channel 42, the gas enters the radial degassing conduits 40 where it urges against the sealing element 38 made up of an O-ring (FIGS. 1 and 2) or of an annular collar (FIG. 4). A predetermined gas pressure differential will momentarily stretch the elastic sealing element 38 such that the gas enters the annular cavity 3,4 in order to escape through the vents 48 provided in the lid 14. As soon as the pressure differential between the interior and the exterior of the battery cell is no longer exceeded, the preloaded elastic sealing element 38 re-engages its seat 36 re-sealing the battery cell. The oval recesses 44 at the outer end of the radial degassing conduits 40 support a smooth discharge of the gases.

As may be seen in FIG. 4, a sensor 60 may be positioned in the annular cavity 34 near the sealing element 38. Such sensor 60 may be a micro-switch, a proximity switch, a wire strain gauge or a photocell in order to detect any deformation of the elastic sealing element 38 during the degassing process. With this arrangement, it is possible to detect the actual gas pressure within the battery cell and to use the measured values for controlling the various battery functions (charging, discharging, control of permitted temperature limits or the like). Such a sensor 60 may also be used to detect the chemical properties of the gases in the battery cell.

Figure 5:
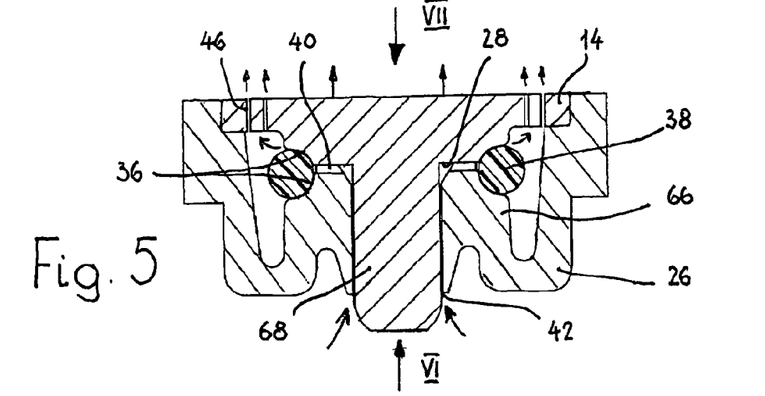
FIG. 5 shows a further embodiment of the invention.

FIG. 5 shows a further and preferred embodiment of the invention, according to which the housing 26 has a cup-shaped section the upper opening of which is closed by the lid 14. The perimeter of the lid 14 is snap-fitted in said opening of the valve housing 26. The annular groove 36 forming the seat for the elastic sealing element 38 (O-ring) is partly formed in the lower surface of the lid 14 and in the opposite upper surface of the inner wall 66 of the housing 26. Thanks to this split-construction, the radial degassing conduits 40 are also formed between the lower surface 28 of the lid 14 and the upper surface of the inner wall 66.

Figures 6, 7, 8:
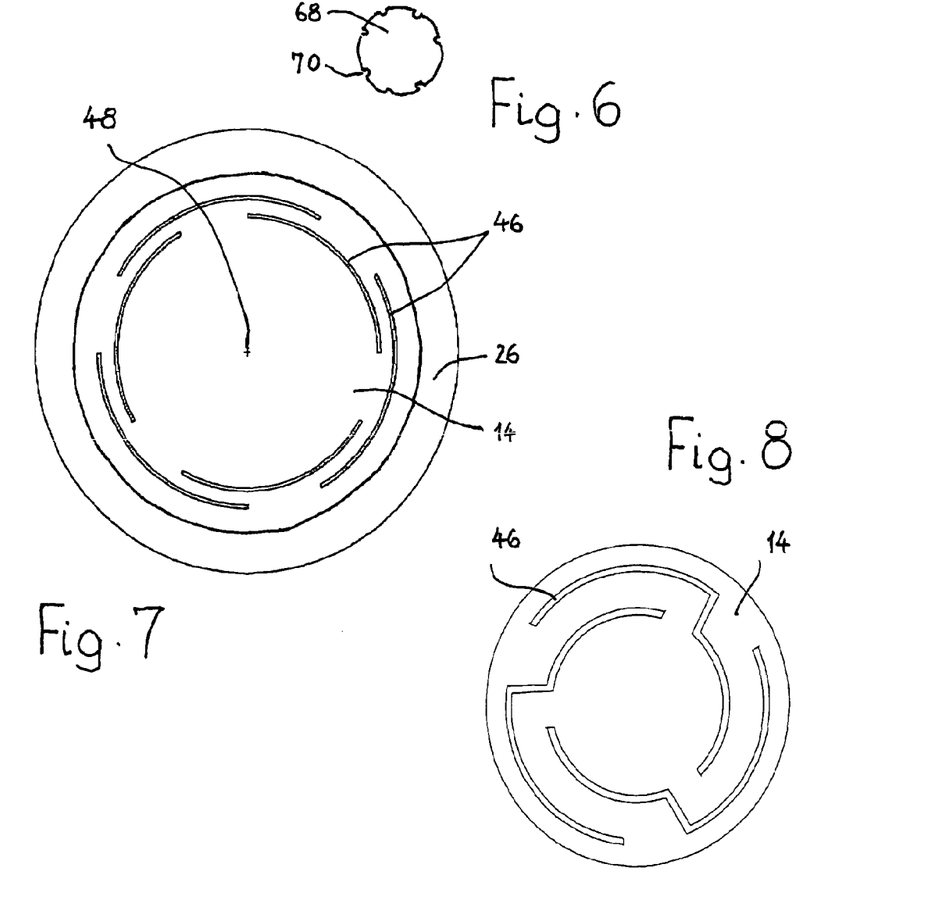
FIG. 6 shows the stem of the valve of FIG. 5 in the direction of arrow VI.
FIG. 7 is a top view of the valve in the direction of arrow VII of FIG. 5.
FIG. 8 is a modification of the lid illustrated in FIG. 7.

From the lower surface 28 of the lid 14, a central stem 68 is axially projecting and engages the cylindrical opening (axial channel 42) of the housing 26. As illustrated in FIG. 6, the cylindrical outer surface of the stem 68 is provided with axial grooves 70.

As illustrated in FIG. 7, the lid 14 is provided with a series of vents 46 in the form of arc-shaped slits concentric to the axis 48 of the lid 14 and in a partial overlapping arrangement such that the rigidity of the lid 14 is weakened in its axial direction.

FIG. 8 illustrates the top view of a lid 14 having a modified arrangement and geometry of the partially arc-shaped slits 46. Also in this embodiment, the lid 14 is weakened such that it is axially flexible as illustrated by the two arrows on the top of the lid 14 in FIG. 5.

Under normal conditions when the battery cell is producing gas, this is allowed to flow between the stem 68 of the lid 14 and the inner wall 66 of the valve housing 26. Normally the gas would then leak through the radial degassing conduits 40 and past the sealing element 38 (O-ring) between the latter and the lid 14. When the gas pressure is increasing, the central part of the lid 14 complete with the stem 68 will move upwards to allow more space between the sealing element 38 and the lid 14 such that more gas may escape. This flexible movement of the central part of the lid 14 is possible due to the nature of the lid 14 itself and the geometry and layout of the vents 46.

Reverse pressure (atmospheric pressure) from outside will force the lid 14 downwards to make more contact pressure with the sealing element 38 and thereby increasing the sealing effect so that no outside air will be able to enter the battery cell at any time.

Figure 9:
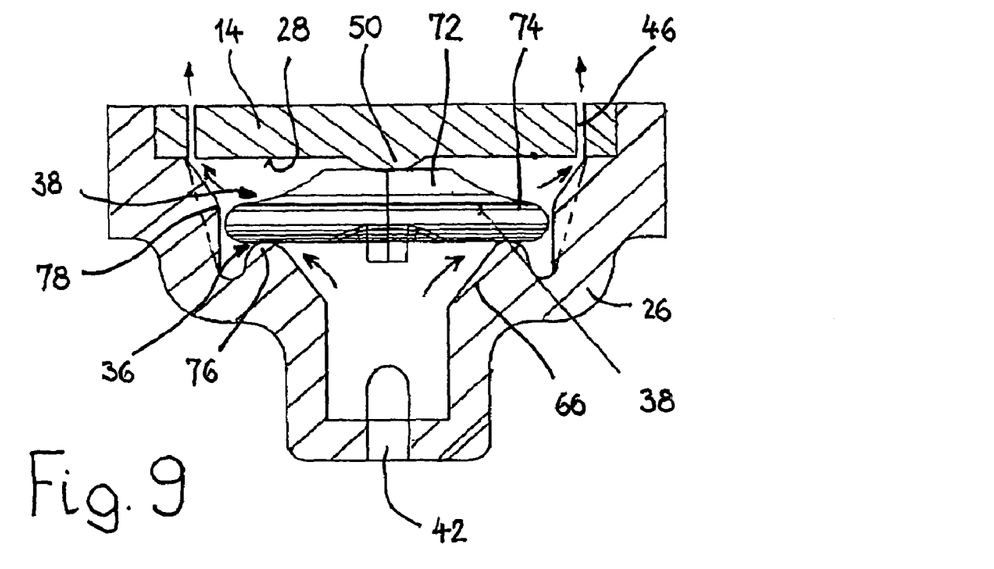
FIG. 9 is a cross-sectional view of a further embodiment of the valve.
Figure 10:
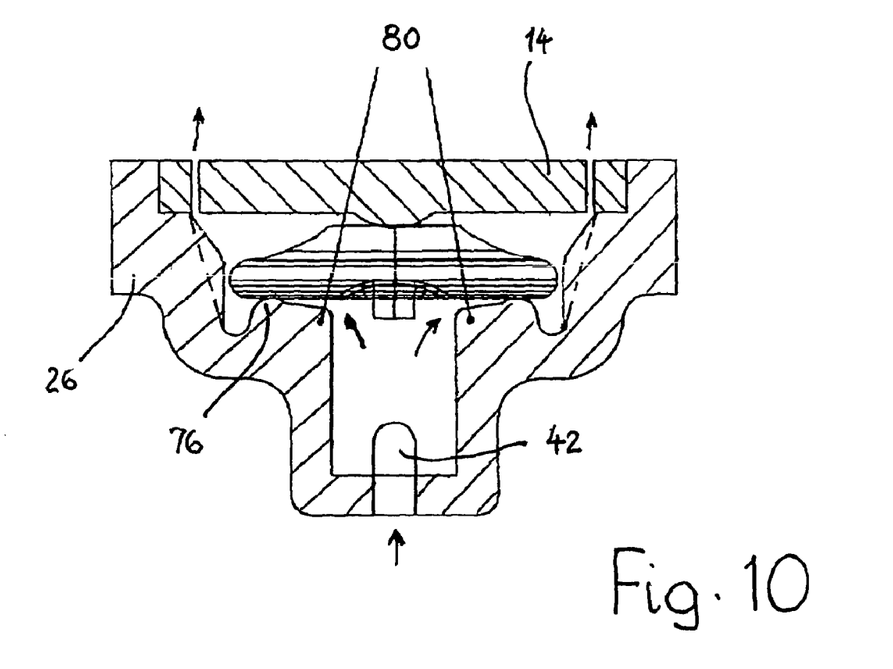
FIG. 10 shows a modified form of the valve of FIG. 9.

FIGS. 9 and 10 illustrate two further embodiments of the invention comprising a valve housing 26 similar to that of FIG. 5 which is closed by a snap-fitted lid 14 provided with vents 46. According to this embodiment, the elastic sealing element 38 is a circular disc of a flexible synthetic material. The disc has a thick central part 72 and a flexible annular outer edge 74 resting on its seat 36 which is in the form of an annular support 76 provided by the inner wall 66 of the housing 26.

From the lower surface 28 of the lid 14 an axially protruding nose 50 is in abutement contact with the central part 72 of the circular disc 38. The circular disc 38 is held in its centered position by means of projections 78 radially protruding from the inner wall 66 of the valve housing 26.

Also in this embodiment, under normal conditions when the battery cell is producing gas, this is allowed to flow as shown by the arrows in FIG. 9. The gas flows between the circular disc 38 and its seat (support 76). The circular disc 38 is held on the upper surface of its central part 72 by means of the nose 50 of the lid 14 which applies a slight pressure on the central part 72. With increasing gas pressure, the outer edge 74 of the disc 38 will flex upwards to allow more gas to escape.

Reverse pressure from outside entering the vents 46 in the lid 14 will force the flexible outer edge 74 of the circular disc 38 downwards against its support 76 to make more contact pressure with said support 76 and thereby increasing the sealing effect so that no outside air will be able to enter the battery cell at any time.

FIG. 10 illustrates a slightly modified embodiment of the valve body 26 of FIG. 9. Here the annular support 76 turns into a radially inner inclined ridge 80 sloping towards the axial degassing channel 42 provided in the housing 26. The main principle of the valve function is similar to the previous version of FIG. 9; however, there is an improvement thanks to the ridge 80 which prevents the elastic disc 38 from collapsing inwards when the valve is subjected to a pressure which is higher on the outside than the internal pressure inside the battery cell. Such a condition can occur when the battery is on an aircraft and is subjected to a low external pressure. Upon landing, the internal pressure of the battery can be much lower than the external atmospheric pressure. This will have a tendency on the circular disc 38 to collapse inwards.

Further advantage of the modified version is to prevent collapse of the elastic disc 38 during an outside explosion. When such an explosion occurs, the external pressure in the vicinity of the valve will reach a very high value when compared with the internal pressure of the battery. The extended ridge 80 will prevent collapse of the elastic circular disc 38.

Figure 11:
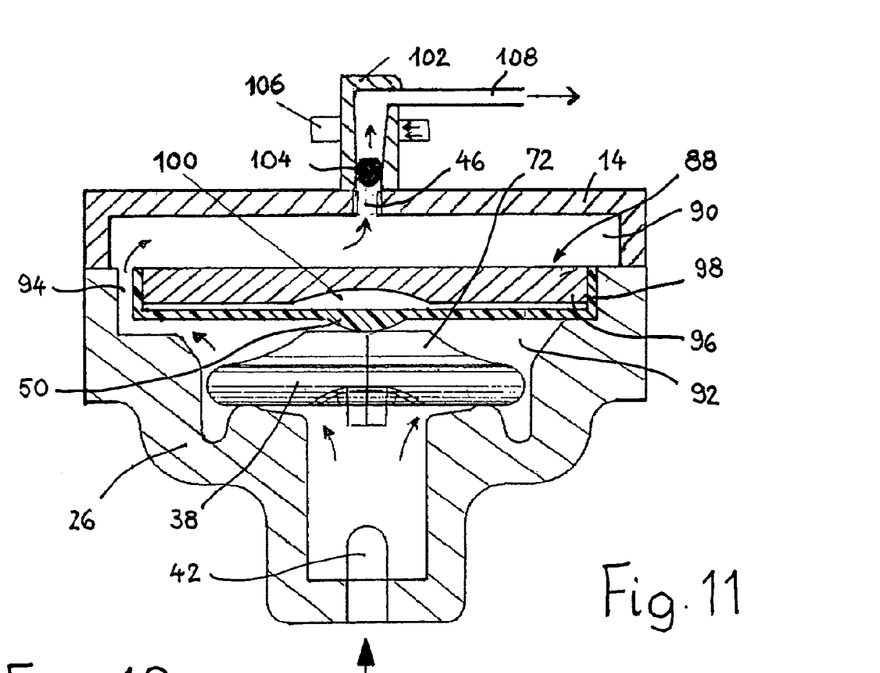
FIG. 11 illustrates a further embodiment.

FIG. 11 illustrates a further embodiment of the invention in which the sealing element 38 is also a circular disc as in FIGS. 9 and 10. However, the space between the lid 14 and the circular disc 38 is divided, by means of a partition element 88, into an upper chamber 90 and a lower chamber 92. The upper chamber 90 is in communication with a central vent 46 formed in the lid 14. The upper chamber 90 and the lower chamber 92 communicate by means of lateral ducts 94 on the periphery of the partition element 88.

The partition element 88 is formed by a rigid upper plate 96 and a lower flexible diaphragm 98, both defining an inner chamber 100. A central nose 50 protruding from the diaphragm 98 acts against the central part 72 of the circular disc 38.

The inner chamber 100 is pressurized to a constant pressure, preferably normal atmospheric pressure. Under normal atmospheric conditions, the valve works as in the previous version of FIGS. 9 and 10. However, when subjected to a reduction of atmospheric pressure, i.e. when the pressure in the chambers 90 and 92 is reduced, the trapped air pressure in the inner chamber 100, which is always a constant pressure, will compensate for this reduction of the ambient pressure. The diaphragm 98 will thus move towards the underlying sealing disc 38 and compensate its pressure on it. Under these conditions, the elastic sealing disc 38 will not open the axial degassing channel 42 although the pressure in the chambers 90 and 92 has decreased.

As the result, the valve sensor contains an ambient pressure-sensitive diaphragm mechanically influencing the sealing element 38 such that it does not release gas when the critical gas release pressure differential between the inside and the outside of the battery is induced by an expected change of the battery ambient pressure instead of by an increase of the internal gas pressure.

A possible use for such an application is in aircrafts, where the ambient pressure is continually changing with the altitude of the aircraft. This embodiment of self-compensating and calibrating gas release valve sensor makes it ideal as a valve for aircraft batteries.

As further illustrated in FIG. 11, it is also possible to apply to the central vent 46 in the lid 14 a collector tube 102 leading the gases via a tube 108 to a remote collector, thus making the area close to the battery gas-free.

The central vertical collector tube 102 illustrated in FIG. 11 may be a transparent tube housing a float ball 104 of solid light material, e.g. rubber or plastic. This ball 104 would float due to the flow of the gas entering the tube 102, and its height could be detected by means of an optical system which can be adjusted for any particular gas-flow limit. The higher the flow, the higher will the ball 104 float.

To the outer side of the tube 102 a transducer 106 is applied which is activated at a predetermined threshold height of the ball 104 such that it transmits an electrical output signal to an alarm and/or control device. With this construction, the measurement of the gas flow serves as an electronic device to trigger an alarm or even switch off the charger if the battery is over charging and over-gassing.

Figure 12:
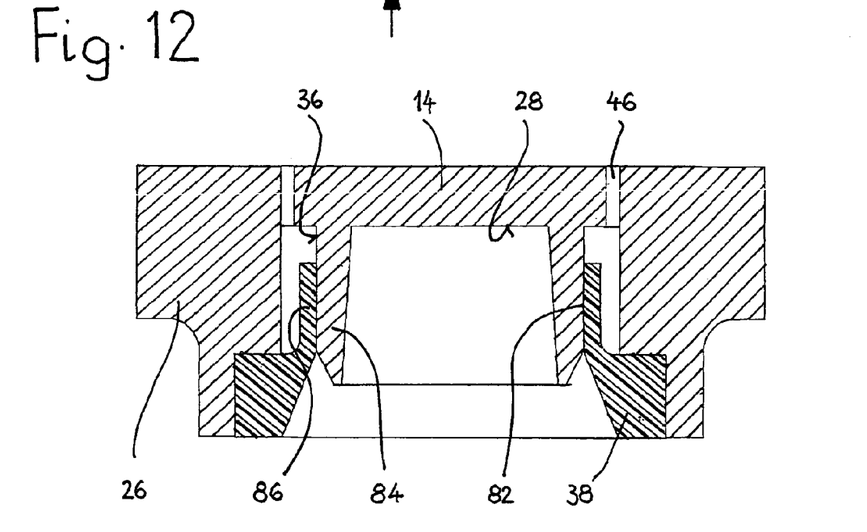
FIG. 12 is a cross-sectional view of a further embodiment of the valve.

FIG. 12 illustrates a further embodiment of the invention, according to which the lid 14 forms an integral part of the housing 26. The preloaded elastic sealing element 38 is in the form of a flexible tubular skirt firmly fastened in an annular recess at the lower end of the housing 26. An upwardly extending inner surface 82 of the tubular skirt 38 is in sealing tight abutment against the outer surface of a cylindrical element 84 projecting from the lower surface 28 of the lid 14.

The preloaded contact of the inner surface 82 of the tubular skirt 38 on the cylindrical seat 36 provided by the cylindrical element 84 prevents any escape of gas from the battery. When the pressure of the gas is increasing, the upper thinner part 86 of the skirt 38 will give way to allow the gas to escape between the skirt 38 and the cylindrical element 84 of the lid 14. The properties and size of the skirt 38 will dictate the calibration of the valve.

Pressure from the opposite direction (atmospheric pressure) will cause the upwardly extending thinner part of the tubular skirt 38 to exert more pressure on its seat 36 and effectively provide a much better seal so that no air will be allowed to enter the battery.

The invention claimed is:

1. A gas release valve for an access port of a battery cell comprising:
   a housing configured for coupling to an adapter plug disposed in the access port, the housing having a lid on a first side and an opening in a second side, the lid having a lower side in the direction of the opening and an upper side in the opposite direction, the opening being in flow communication with the battery cell;
   one or more degassing passageways providing flow communication between the opening and one more vents provided in the lid;
   a seat provided in the flow path between the opening and the one or more vents; and
   a sealing element disposed on the seat, the sealing element closing the one or more degassing passageways,
   wherein the sealing element is preloaded against the seat by elastic properties of the sealing element,
   wherein the sealing element becomes further preloaded against the seat by in presence of a pressure differential acting from the one or more vents against the sealing element, and
   wherein the sealing element is an annular collar or an O-ring.

2. The gas release valve according to claim 1, wherein the seat is in the form of an annular groove.

3. The gas release valve according to claim 1,
   wherein each of the one or more degassing passageways comprises a degassing conduit providing flow communication between the opening and the seat, and
   wherein the degassing conduit is formed between a surface of the lid coupled to the housing and an opposite surface on a surface of the housing.

4. The gas release valve according to claim 1,
   wherein the opening is shaped as a degassing channel disposed axially in the housing, and
   wherein the degassing channel is formed between a central stem axially projecting from the lower side of the lid and a wall of the opening.

5. The gas release valve according to claim 4, wherein the degassing channel is defined by axial grooves provided on an outer surface of the stem.

6. A gas release valve for an access port of a battery cell comprising:
   a housing configured for coupling to an adapter plug disposed in the access port, the housing having a lid on a first side and an opening in a second side, the lid having a lower side in the direction of the opening and an upper side in the opposite direction, the opening being in flow communication with the battery cell;
   one or more degassing passageways providing flow communication between the opening and one more vents provided in the lid;
   a seat provided in the flow path between the opening and the one or more vents; and
   a sealing element disposed on the seat, the sealing element closing the one or more degassing passageways,
   wherein the sealing element is preloaded against the seat by elastic properties of the sealing element,
   wherein the sealing element becomes further preloaded against the seat by in presence of a pressure differential acting from the one or more vents against the sealing element,
   wherein the sealing element is a disk having a thicker central part and a flexible annular outer edge,
   wherein the disk is disposed on the seat,
   wherein the seat is shaped as an annular support provided on a wall of the opening,
   wherein the annular support extends to form a radially inclined ridge sloping inward into the opening, and
   wherein the ridge causes a narrowing of the opening.

7. The gas release valve according to claim 6, wherein the disk is held in a centered position in the opening by projections radially protruding from the wall of the opening.

8. The gas release valve according to any of claim 6, wherein the lower side of the lid includes an axially protruding nose in abutment contact with the central part of the disk.

9. The gas release valve according to claim 6,
   wherein a space between the lid and the disc is divided by a partition element into an upper chamber in the direction of the lid and in flow communication with the one or more vents, and a lower chamber in flow communication with the upper chamber by at least one duct formed at the periphery of the partition element,
   wherein the partition element includes an inner chamber at an essentially constant pressure and closed by a flexible diaphragm, and
   wherein the flexible diaphragm acts against the disk in one or more points.

10. The gas release valve according to claim 6, wherein the lid is flexible in an axial direction of the housing.

11. The gas release valve according to claim 6,
   wherein the one or more vents are arc-shaped slits, and
   wherein more than one vent are disposed in a radial direction of the disk, causing the rigidity of the lid to be weakened.

12. A gas release valve for an access port of a battery cell comprising:
- a housing configured for coupling to an adapter plug disposed in the access port, the housing having a lid on a first side and an opening in a second side, the lid having a lower side in the direction of the opening and an upper side in the opposite direction, the opening being in flow communication with the battery cell;
- one or more degassing passageways providing flow communication between the opening and one more vents provided in the lid;
- a seat provided in the flow path between the opening and the one or more vents; and
- a sealing element disposed on the seat, the sealing element closing the one or more degassing passageways,
- wherein the sealing element is preloaded against the seat by elastic properties of the sealing element,
- wherein the sealing element becomes further preloaded against the seat by in presence of a pressure differential acting from the one or more vents against the sealing element,
- wherein the sealing element is a flexible tubular skirt coupled to the housing,
- wherein an upper portion of the tubular skirt extends in the direction of the lid to be in sealing abutment against the seat, and
- wherein the seat is provided on an outer surface of a cylindrical element projecting from the lower surface of the lid.

13. The gas release valve according to claim 12, wherein the lid is an integral part of the housing.

14. A gas release valve for an access port of a battery cell comprising:
- a housing configured for coupling to an adapter plug disposed in the access port, the housing having a lid on a first side and an opening in a second side, the lid having a lower side in the direction of the opening and an upper side in the opposite direction, the opening being in flow communication with the battery cell;
- one or more degassing passageways providing flow communication between the opening and one more vents provided in the lid;
- a seat provided in the flow path between the opening and the one or more vents;
- a baffle element disposed in the proximity of an edge of the opening facing the battery cell, and
- a sealing element disposed on the seat, the sealing element closing the one or more degassing passageways,
- wherein the sealing element is preloaded against the seat by elastic properties of the sealing element,
- wherein the sealing element becomes further preloaded against the seat by in presence of a pressure differential acting from the one or more vents against the sealing element, and
- wherein the baffle element is provided with one or more inlet channels having tubular extension conduits.

15. The gas release valve according to claim 14, wherein the tubular extension conduits are provided with self-acting shutters.

16. A gas release valve for an access port of a battery cell comprising:
- a housing configured for coupling to an adapter plug disposed in the access port, the housing having a lid on a first side and an opening in a second side, the lid having a lower side in the direction of the opening and an upper side in the opposite direction, the opening being in flow communication with the battery cell;
- one or more degassing passageways providing flow communication between the opening and one more vents provided in the lid;
- a seat provided in the flow path between the opening and the one or more vents; and
- a sealing element disposed on the seat, the sealing element closing the one or more degassing passageways,
- wherein the sealing element is preloaded against the seat by elastic properties of the sealing element,
- wherein the sealing element becomes further preloaded against the seat by in presence of a pressure differential acting from the one or more vents against the sealing element, and
- wherein the sealing element is coupled to a sensor detecting a deformation of the sealing element so to determine the actual gas pressure in the battery cell.

17. The gas release valve according to claim 16, wherein the one or more vents are connected to a collector tube for leading the gases to a remote collector.

18. The gas release valve according to claim 16, wherein at least one of the vents is connected to a gas flow measurement device generating an output signal to be transmitted to a control and/or alarm device.

19. The gas release valve according to claim 18,
- wherein the gas flow measurement device is a transparent tube housing a float ball, and
- wherein a transducer element is connected with the control and/or alarm device and is activated when the float ball is displaced beyond a predetermined point.

* * * * *